United States Patent
Herz

Patent Number: 5,881,202
Date of Patent: Mar. 9, 1999

[54] VARIABLE SPEED PLAYBACK OF DIGITAL VIDEO STORED IN A NON-TAPE MEDIA

[75] Inventor: William S. Herz, Newark, Calif.

[73] Assignees: Sony Corporation, Tokyo, Japan; Sony Electronics Inc., Park Ridge, N.J.

[21] Appl. No.: 872,415

[22] Filed: Jun. 10, 1997

Related U.S. Application Data

[63] Continuation of Ser. No. 774,449, Dec. 30, 1996, Pat. No. 5,671,318, which is a continuation of Ser. No. 485,929, Jun. 7, 1995, abandoned, which is a continuation of Ser. No. 54,579, Apr. 29, 1993, Pat. No. 5,543,927.

[51] Int. Cl.⁶ .............................. H04N 5/91; H04N 5/917
[52] U.S. Cl. ............................................ 386/68; 386/111
[58] Field of Search ................................... 386/6, 68, 67, 386/69, 7, 8, 27, 109, 111; 348/469, 458, 443; 360/32; H04N 5/91, 5/917

[56] References Cited

U.S. PATENT DOCUMENTS

5,072,296  12/1991  Lim .......................................... 358/140
5,404,170   4/1995  Keating ................................... 348/443

*Primary Examiner*—Robert Chevalier
*Attorney, Agent, or Firm*—Peter C. Toto, Esq.; Jerry A. Miller

[57] ABSTRACT

A method for high speed playback of digital video data (e.g. D1 or D2 data) in which, at lower speeds, the frames of data to be played back are made of a mixture of consecutive frames of data. The frames of data are mixed by averaging the pixel values over consecutive frames to make up the output frames. For high speed shuttle operation, non-consecutive frames are averaged on a pixel by pixel basis to create shuttle frames. In order to improve the appearance of the output, consecutive shuttle frames contain a common original frame so that a component of the original data spans two output frames.

18 Claims, 5 Drawing Sheets

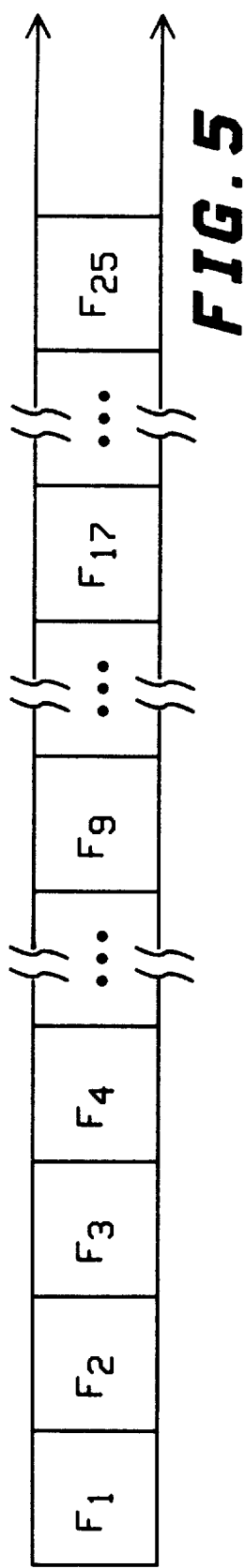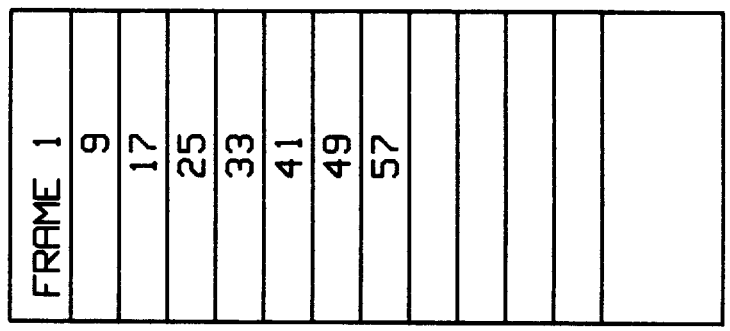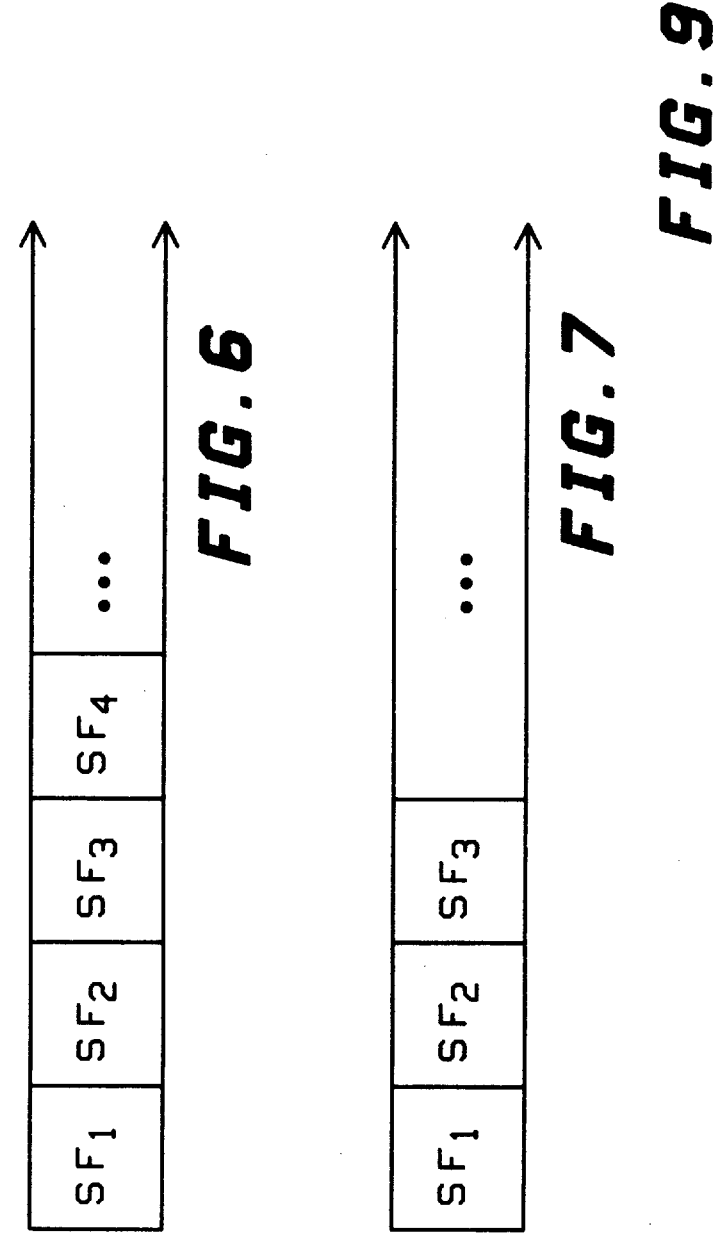

VARIABLE SPEED PLAYBACK OF DIGITAL VIDEO STORED IN A NON-TAPE MEDIA

This application is a continuation of application Ser. No. 08/774,449, now U.S. Pat. No. 5,671,318, filed Dec. 30, 1996, which is a continuation of application Ser. No. 08/485,929, filed Jun. 7, 1995, now abandoned, which is a continuation of Ser. No. 08/054,579 filed Apr. 29, 1993, now U.S. Pat. No. 5,543,927, which are hereby incorporated by reference.

BACKGROUND

1. Field of the Invention

This invention relates generally to the field of playback of digital video as in a digital video tape recorder (VTR) or virtual digital VTR. More particularly, this invention relates to performing variable speed playback and shuttle of compressed digital video material in a manner which emulates the performance of a video tape recorder's variable speed playback and shuttle. The present invention is also useful in instances where temporal compression is needed (i.e. judicious merging elements of video frames to compensate for smaller display interval of a rapid video frame display).

2. Background of the Invention

In video tape recorders, variable speed playback of the video material is generally accomplished by increasing the tape speed during playback and providing dynamic tracking. In video tape editing application, such variable speed playback has a distinctive look which editors are accustomed to.

When a moving video image is stored digitally and retrieved at a higher than normal playback rate, this is generally accomplished by simply deleting (or not retrieving) frames of information. For example, with reference to FIG. 1, if the ten sequential frames $F_1$ through $F_{10}$ which are shown in FIG. 1 are to be played back at twice the normal playback rate, only alternate frames might be displayed. For example, frames $F_1$, $F_3$, $F_5$, $F_7$ and $F_9$ would be displayed at the normal frame rate while frames $F_2$, $F_4$, $F_6$, $F_8$ and $F_{10}$ would be omitted entirely. Consequently, only five frames of information would be displayed at a standard frame rate requiring only half the display time. Thus, the illusion that the image has been displayed at twice normal speed is created.

Unfortunately, when non-contiguous frames of digital video are consecutively displayed to produce a high speed image, a rough jumpy display results resembling a montage or a teleconferencing-type image in which updates are slower than real time resulting in discontinuous video. This type of implementation thus diverges substantially from the look of a video tape recorder's variable speed playback. In a video tape recorder, the motion is smooth and continuous but occurs at a higher rate. At high speed shuttle rates wherein discontinuous frames of video are consecutively displayed, the human brain has difficulty tracking the movement and little information is thus conveyed to the user.

It is desirable to create a simulation of this variable speed playback such as appears in analog VTR equipment for use in technology such as optical, magneto optical, magnetic and other storage media wherein, in general, the video frames are randomly accessible and not necessarily temporally ordered (e.g., frame 1 of a video sequence could be adjacent to frame 20 in a video sequence). Applications such as disk based non-linear editors for digital video are appropriate candidates for such technology.

SUMMARY OF THE INVENTION

It is an object of the present invention to provide an improved variable speed playback system for playing back compressed digital video.

It is another object of the invention to emulate the performance of a video tape recorder's variable speed playback and shuttle in a digital video environment, i.e. retaining the look of dynamic tracking.

These and other objects, advantages and features of the invention will become apparent to those skilled in the art upon consideration of the following description of the invention.

The present invention provides for mixing or proportional merging of two or more video frames to occupy proportionately less of a normal display time to yield a smooth update of the video image.

For variable speed play (approximately −1× to +3×), a video mix is performed on adjacent video frames. Since no more than 3× speed is required, no more than three frames of video need to be mixed. The mix is accomplished by adding the respective pixel values of the respective frames and dividing by the number of frames. Thus, when two frames are mixed, each frame contributes a 50% weighting to the resulting frame. For fractional speeds (e.g. 2.5×) alternating "mixed frames" constructed of two frames and three frames respectively are generated to produce a long term average of 2.5× in speed.

For shuttle operation (e.g. ±3× to ±30×) a different technique is used. In this technique, non-contiguous frames are combined with consecutive resulting frames ("shuttle frames" or "bridge frames") using a common frame to produce the mix. This creates an image which is much smoother and easier for the user to understand. In instances where the system holds bursts of data from a storage media in a buffer until processing can occur or until new data is loaded (in this case compressed video frames), and where the buffers cannot hold contiguous frames, the shuttle frame is constructed in a slightly different manner. Assuming a maximum buffer fill rate of one non-contiguous frame per eight frame time intervals, only one new frame per eight frames of video can be output. This is handled by holding a given frame long enough to compensate for this temporal limiting factor.

According to the present invention, a method for high speed playback of digital video data (e.g. D1 or D2 data) in which, at lower speeds, the frames of data to be played back are made of a mixture of consecutive frames of data. The frames of data are mixed by averaging the pixel values over consecutive frames to make up the output frames. For high speed shuttle operation, non-consecutive frames are averaged on a pixel by pixel basis to create bridging frames (referred to herein as shuttle frames). In order to improve the appearance of the output, consecutive shuttle frames contain a common original frame so that a component of the original data spans two output frames.

One method of the present invention for playback of video data at a speed greater than normal playback speed, includes the steps of: generating a sequence of output frames including a mixed frame where the mixed frame has a component of two or more frames of the original video data; and displaying the sequence of output frames.

Another method for playback of video data at a speed greater than normal playback speed, includes the steps of: looking up a first number of frames in a look-up table; creating a first mixed frame by averaging the first number of consecutive frames of data on a pixel by pixel basis; looking up a second number of frames in a look-up table; creating a second mixed frame by averaging the second number of consecutive frames of data on a pixel by pixel basis; generating a sequence of output frames including a sequence of the mixed frames; displaying the sequence of output frames at a frame rate equal to a normal playback speed frame rate.

A method for high speed shuttle playback of video data according to the invention includes the steps of: generating a sequence of output frames including a plurality of mixed frames, the mixed frames having a component of two or more frames of said video data; each mixed frame including a component of a previous output frame; and displaying the sequence of output frames. The shuttle frames are generated at a rate of 1 shuttle frame for each M video frames, where M is generally an integer.

According to one embodiment of the invention, an apparatus for high speed playback of digital video data includes a mass storage device for storing frames of video data. An input device is used to select a playback speed. Frames of video data are retrieved from the storage device and a computer generates a sequence of output frames including a mixed frame, the mixed frame having a component of at least two frames of the video data. A display displays the sequence of output frames.

The features of the invention believed to be novel are set forth with particularity in the appended claims. The invention itself, however, both as to organization and method of operation, together with further objects and advantages thereof, may be best understood by reference to the following description taken in conjunction with the accompanying drawing.

BRIEF DESCRIPTION OF THE DRAWING

FIG. 5 is an illustration of a sequence of video frames as they would be played back at normal speed.

FIG. 6 is an illustration of five consecutive shuttle frames representing a shuttle speed of 8×.

FIG. 7 is an illustration of four consecutive shuttle frames representing a shuttle speed of 16×.

FIG. 9 is an illustration of buffer operation in the present invention.

DETAILED DESCRIPTION OF THE INVENTION

Figure 1:
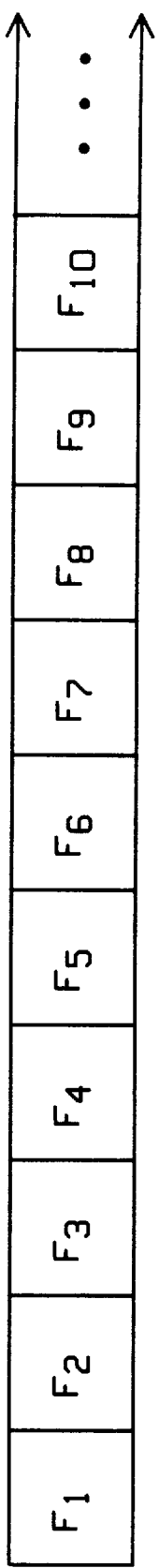
FIG. 1 is an illustration of ten sequential video frames as they would be played back at normal speed.

While this invention is susceptible to embodiment in many different forms, there is shown in the drawings that will herein be described in detail specific embodiments, with the understanding that the present disclosure is to be considered as an example of the principles of the invention and not intended to limit the invention to the specific embodiment shown and described.

Figure 2:
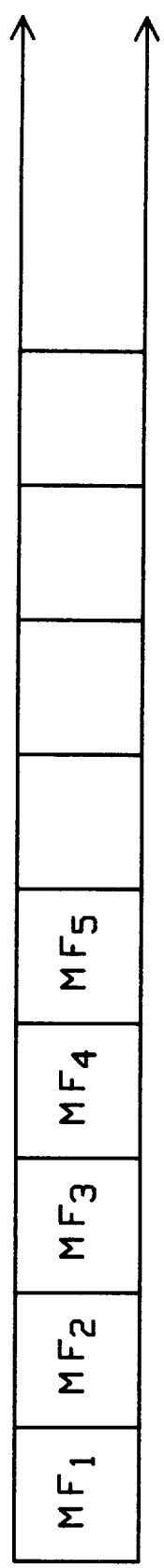
FIG. 2 is an illustration of five mixed frames which would display the information from FIG. 1 at two times the normal playback rate.

Referring to FIG. 1, a sequence of ten sequential frames of video is shown labeled $F_1$ through $F_{10}$. At standard video speeds, frames 1 through 10 would be sequentially displayed at a fixed frame rate (e.g. 1 frame every 33.33 ms for NTSC) to produce normal speed video. If it is desired to show this video at faster than normal rate, the present invention utilizes the following technique for generating the higher rate video. Consider first, the example shown in FIG. 2 wherein the speed selected is twice the normal video rate. In this example, it is desirable to produce five sequential frames of video which represent the ten original frames of FIG. 1 but which can be viewed in half the time. Thus, the current invention generates five "mixed frames" (MF) shown in FIG. 2 as $MF_1$ through $MF_5$. In examples lower in speed than approximately three times the normal video rate (that is, at variable speed play rates) each mixed frame is generated as a combination of two or more of the original frames $F_1$ through $F_{10}$. In FIG. 2 for example, $MF_1$ would be generated by summing the pixel values of frames $F_1$ and $F_2$ and dividing the sum by two. That is:

$$MF_1 = (F_1 + F_2) \div 2$$

For D1 video, each pixel is represented as 2 eight bit bytes containing ($YC_R$ or $YC_B$) where Y is luminance, $C_R$ is Red chrominance and $C_B$ is Blue chrominance (in PAL, Y, U and V) In this instance, the individual values of Y, $C_R$, and $C_B$ are determined for each frame and then individually averaged and converted back to ($YC_R$ or $YC_B$). While the present invention is illustrated in terms of D1 data, similar pixel by pixel combining of video frames can be accomplished using RGB images (as in 3 byte per pixel data representing high definition video) by separating each pixel into R, G and B components. The R, G and B component of each pixel is then averaged to produce the mixed frame. Similar techniques can be used for other formats.

Figure 3:
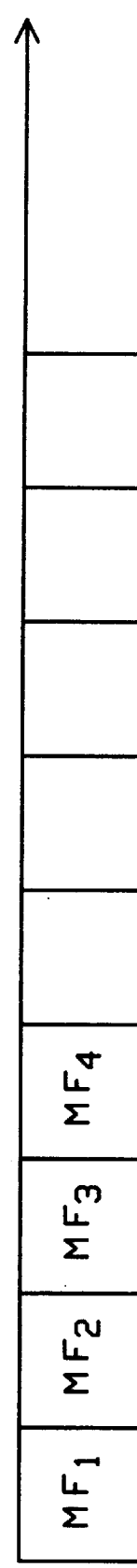
FIG. 3 illustrates four mixed frames which would be played back to produce 2.5 times the normal playback rate of FIG. 1.

In the case where a fractional speed increase is desired, a modification of the process is used. Consider for example the generation of mixed frames for a video rate of 2.5 times normal. In this instance, the mixed frame data is generated in a manner which produces a long term average of about 2.5 frames of original video data for each mixed frame of video data. In the example of FIG. 3, $MF_1$ may be created by mixing together the information from $F_1$, $F_2$ and $F_3$ as follows:

$$MF_1 = (F_1 + F_2 + F_3) \div 3$$

$MF_2$ is then generated as $$MF_2 = (F_4 + F_5) \div 2.$$

In this manner, alternating mixed frames are generated as combinations of two and three original data frames.

A similar scheme can be derived for virtually any fractional speed. For example, if a rate of 2.7 times normal is desired, seven out of ten frames of mixed frame data are generated as a combination of three original frames. The remaining frames are generated as a combination of two original frames. In order to retain as smooth an image as possible, the distribution of mixed frames created as a mixture of two and three original frames should be a relatively even distribution in time to the extent possible.

In the case of the preferred embodiment, as previously described, this mixing process is carried out on a pixel by pixel basis for D1 format video which is represented by two bytes per pixel. These two bytes represent Y, $C_R$ and $C_B$ data so, the Y data is added and divided by two, the $C_R$ data is added and divided by 2, and the $C_B$ data is added and divided by two to produce each pixel of the mixed frame $MF_1$. Thus, in general, a mixed frame of data can be represented by the equation:

$$MF_j = \sum_{j=i}^{i+k} \frac{F_i}{k}$$

where i, j and k are integers with i representing a counter for an original data frame, j representing a counter for a mixed frame (MF) and k representing a number of original frames to be averaged. In one embodiment of the present invention, the original frames are processed in sequences of 10 frames so that the pattern repeats after ten mixed frames are generated. In this embodiment, the value of k can be read from a look-up table such as the following TABLE 1:

TABLE 1

| | M | | | |
|---|---|---|---|---|
| N | 2.3 | 2.4 | 2.5 | 2.6 |
| 1 | 2 | 2 | 3 | 3 |
| 2 | 2 | 3 | 2 | 2 |
| 3 | 3 | 2 | 3 | 3 |
| 4 | 2 | 3 | 2 | 2 |
| 5 | 2 | 2 | 3 | 3 |
| 6 | 3 | 2 | 2 | 3 |
| 7 | 2 | 3 | 3 | 2 |
| 8 | 2 | 2 | 2 | 3 |
| 9 | 3 | 3 | 3 | 2 |
| 10 | 2 | 2 | 2 | 3 |

In TABLE 1, as shown in abbreviated form, all desired speeds in 0.1× increments between 1.1 and 3.0 are listed along with a number of original frames to be combined. When mixed frame number 10 is reached (N=10) the sequence starts over again. When coupled with a motion vector, a different distribution of frame weighting can be implemented in order to achieve an even more efficient use of frames with a more intelligent distribution.

Figure 4:
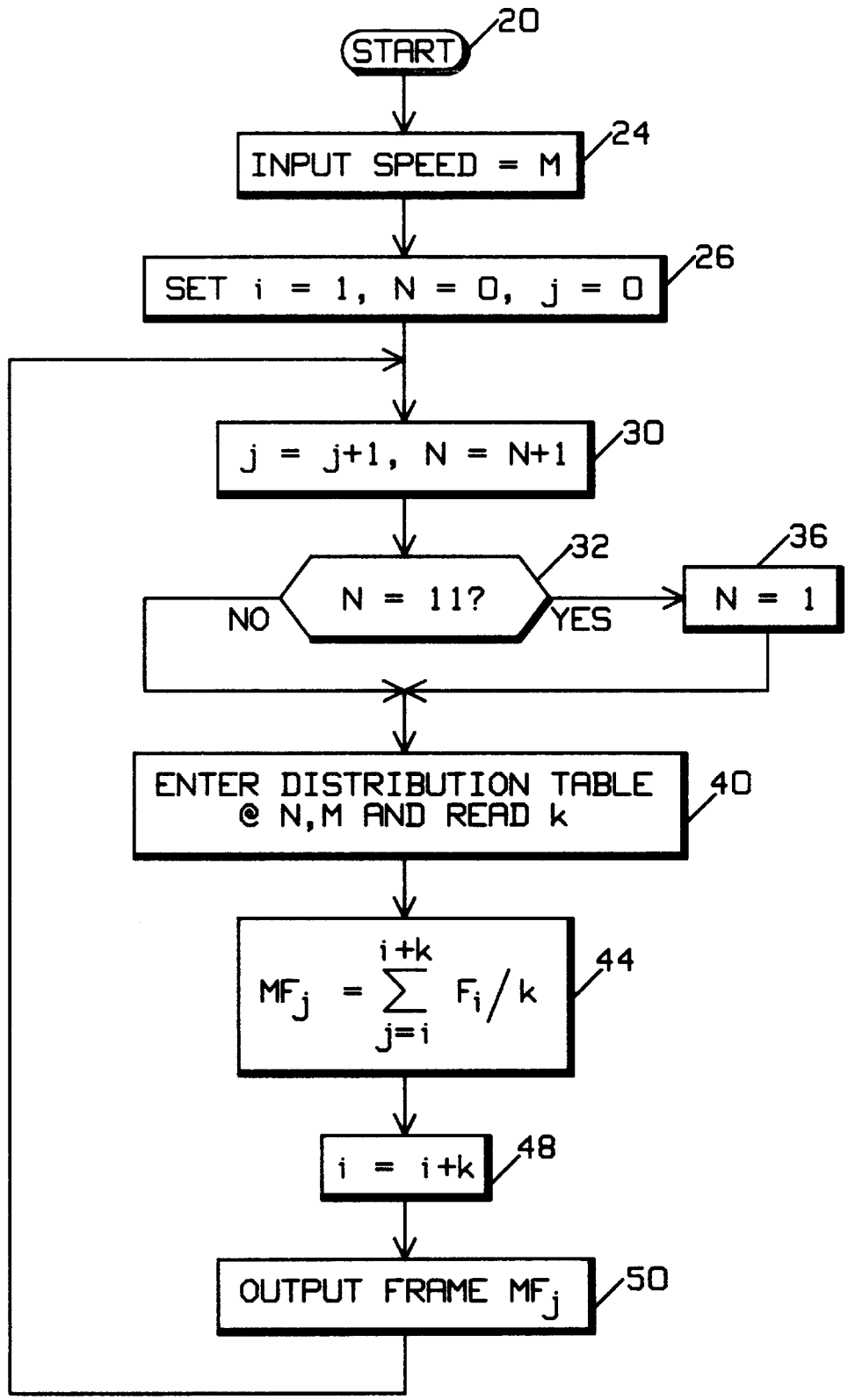
FIG. 4 is a flow chart describing the operation of the present invention for variable playback speeds.

The process for variable speed operation at forward speeds between 1.1 and 3 times normal is described by the flow chart of FIG. 4. Those skilled in the art will appreciate that the analogous process for reverse speeds is also within the scope of the present invention. The process starts at step 20. When the user selects a playback speed, it is received at step 24 as a speed value M. Counters i, N and j are initialized to 1, 1 and 0 respectively at step 26. Counter j is a mixed frame counter, counter i is an original frame counter and N is a counter used to enter the look-up table. At step 30, j and N are incremented by 1. If N=11 at step 32, the look-up table counter N is reset to 1 at step 36. In either event, at step 40, the look-up table is entered on the values of M and N to retrieve the value of k (the number of original frames to be mixed). Note that k may vary in value each time it is retrieved from the distribution table (i.e. each time step 40 is carried out).

When the value of k has been retrieved, the mixed frame is computed on a pixel by pixel basis as described by Equation 1 at step 44. The value of i is then incremented by the number of original frames processed (k) in step 48. The frame is then output at step 50 and the process loops back to step 30.

Those skilled in the art will recognize that the frame combinations described in TABLE 1 can be changed considerably without departing from the invention. For example, column 2.5 could equally be 2,3,2,3,2,3,2,3,2,3 (top to bottom). Also, the table can be restricted to the fractional part of the speed (0.0 to 0.9) with a similar algorithm wherein the integer part is added to the value looked up to arrive at k. Rather than use of a look-up table, various algorithms could be developed to provide the frame distribution and averaging. It is also noted, that for speeds between 1.0 and 2.0, the values of N will sometimes be equal to one, indicating that no mixing of frames occurs for that particular "mixed frame". Rather, that frame is simply equal to the original frame.

For reverse speeds, the present invention works in essentially the same manner. Since the video frames are randomly accessible, the only difference is that the frame numbers for the original data are renumbered in reverse order, or equivalently, the algorithm of FIG. 4 can be modified suitably to accomplish the reverse process.

When high speed shuttle operation is desired in the context of the present invention, an additional problem surfaces. At higher speeds, the human brain finds it difficult to process sequential images which represent frames of information too far separated in time. For example, using conventional shuttling techniques at eight times normal speed, only every eighth frame would be displayed. Due to the generally significant differences in the image of frames separated this far in time, the resulting sequence of frames is difficult for an observer to follow and understand. In order to improve the ability to track such information, a variation of the present process is used. In FIG. 5 an extended representation of the original data of FIG. 1 is shown. The reader will understand that additional frames of original data follow frame 25 when viewing the data at normal speed.

In shuttle operation as illustrated in FIG. 6 mixed frames of data, which will be referred to herein as shuttle frames, are generated as represented by $SF_1$ through $SF_4$ in FIG. 6. Consider the example of playback at eight times normal speed for the example of FIG. 6. In this example, shuttle frame $SF_1$ is made identical to frame $F_1$. It is generally better to begin (and end) with an unaltered frame to give the user a clear starting (and ending) image. Frame $SF_2$ is generated by mixing the pixel values of frame 1 and frame 9 so that $SF_2$ is given by the following equation:

$$SF_2 = (F_1 + F_9) \div 2.$$

In a similar manner, $SF_3$ and $SF_4$ are generated as:

$$SF_3 = (F_9 + F_{17}) \div 2.$$

$$SF_4 = (F_{17} + F_{25}) \div 2.$$

Thus, to the extent possible, each shuttle frame contains a component from the previous frame (after the very first frame). That is, $SF_2$ and $SF_1$ both include frame $F_1$ as a component. In a like manner, $SF_3$ and $SF_2$ both contain the component $F_9$, and $SF_4$ and $SF_3$ both contain the component $F_{17}$. Due to the common subject matter contained in each adjacent shuttle frame, the human brain is more readily able to understand the high speed video action which is presented, and the video image more closely resembles that of shuttle on a VTR. Subsequent frames are generated in a similar manner, except that it is preferrable to end with an unaltered frame taken from the original collection of frames to provide a clear image at the end point.

In a similar manner, FIG. 7 illustrates a shuttle speed of 16 times normal. Here once again $SF_1$ equals $F_1$. $SF_2$ is made up of pixel values created from $F_1$ and $F_{17}$ as:

$$SF_2 = (F_1 + F_{17}) \div 2$$

$SF_3$ is given by:

$$SF_3 = (F_{17} + F_{33}) \div 2.$$

Each consecutive frame is thus constructed using a common component from the previous frame and a component which will become part of the following frame. While this example uses the 17th, 33rd, 49th, etc. frame, other suitable representative frames could be selected. At the end point, it is once again desirable to end with an unaltered frame to provide a clear end point image.

Figure 8:
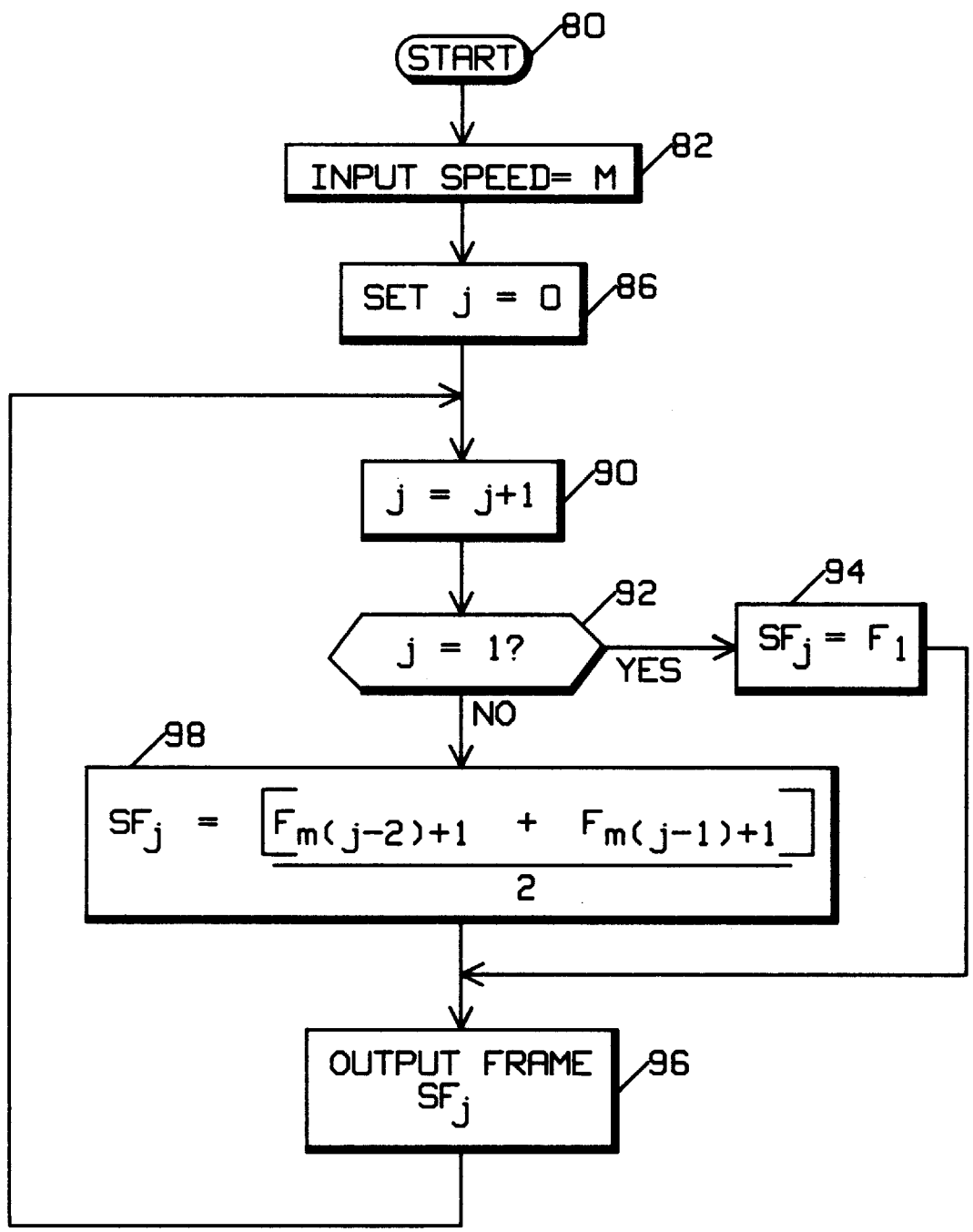
FIG. 8 is a flow chart describing the operation of the present invention at shuttle playback speeds.

Turning now to FIG. 8, a flow chart describing the process of shuttle speed playback as illustrated in FIGS. 5 through 7 is shown starting at 80. Once again, the user enters the shuttle playback speed at 82 as a value M. In shuttle mode, the value of M is an integer between 3 and 30. The value of j (the shuttle frame counter) is initialized at step 86 to a value of 0 and incremented at step 90 by 1. For the first shuttle frame ($SF_1$, j=1), the value of the shuttle frame is simply that of original frame 1 ($F_1$). Thus, at step 92, the value of j is inspected. If j=1 at 92, $SF_j=F_1$ at step 94 and the frame is output at step 96. If j>1 at step 92, the process goes to step 98 where $SF_j$ is computed as:

$$SF_j = \frac{[F_{M(j-2)+1} + F_{M(j-1)+1}]}{2}$$

Finally, at step 96, the computed frame $SF_j$ is output and the process returns to step 90 where j is incremented and the next frame is computed.

In the above shuttle play process, there is no provision for presenting an end point image having no mixed frame component. In general, as previously mentioned, it is desirable, but not required, to present an image which is unaltered as the last frame. Depending upon the number of frames to be presented, this generally leads to an additional frame presented at the beginning and end of the shuttle. Thus, to display e.g., 57 frames of video at 8×, one would expect a total of 57÷8=7.125≈7 shuttle frames to be produced. In fact, 7 shuttle frames are produced, but if it is desired to produce a clear image at the start and end, two additional frames, one at the beginning and one at the end, are presented for display ($F_1$ and $F_{57}$). For short sequences of shuttle frames, this obviously leads to an actual shuttle rate less than the selected value (in this example 8× is selected, but the actual effective rate is 57 frames÷9 frames= 6.33×). As the length of the sequence increases, the number of additional frames remains two, so the effect is minimal. For example, if 1000 original frames are shuttled at 8×, 125 shuttle frames plus 2 frames (beginning and end) would be displayed resulting in an actual shuttle rate of 1000 frames÷127 frames=7.87×.

When the end point does not lie exactly at a multiple of the shuttle rate plus 1, (e.g. for 8×: 9, 17, 25, 33 . . . ), an adjustment of the algorithm is needed to complete the shuttle frame sequence. This can be accomplished in several ways, any of which are acceptable. For example, consider an 8× sequence of frames ending at frame $F_{30}$. Any of the following sequences produce an acceptable shuttle frame sequence:

| Sequence 1 | Sequence 2 |
|---|---|
| $SF_1 = F_1$ | $SF_1 = F_1$ |
| $SF_2 = (F_1 + F_9) \div 2$ | $SF_2 = (F_1 + F_{11}) \div 2$ |
| $SF_3 = (F_9 + F_{17}) \div 2$ | $SF_3 = (F_{11} + F_{20}) \div 2$ |
| $SF_4 = (F_{17} + F_{25}) \div 2$ | $SF_4 = (F_{20} + F_{30}) \div 2$ |
| $SF_5 = F_{30}$ | $SF_5 = F_{30}$ |
| Sequence 3 | Sequence 4 |
| $SF_1 = F_1$ | $SF_1 = F_1$ |
| $SF_2 = (F_1 + F_9) \div 2$ | $SF_2 = (F_1 + F_9) \div 2$ |
| $SF_3 = (F_9 + F_{17}) \div 2$ | $SF_3 = (F_9 + F_{17}) \div 2$ |
| $SF_4 = (F_{17} + F_{25}) \div 2$ | $SF_4 = (F_{17} + F_{25}) \div 2$ |

-continued

| | |
|---|---|
| $SF_5 = F_{30}$ | $SF_5 = (F_{25} + F_{30}) \div 2$ |
| | $SF_6 = F_{30}$ |
| Sequence 5 | Sequence 6 |
| $SF_1 = (F_1 + F_9) \div 2$ | $SF_1 = (F_1 + F_9) \div 2$ |
| $SF_2 = (F_9 + F_{17}) \div 2$ | $SF_2 = (F_9 + F_{17}) \div 2$ |
| $SF_3 = (F_{17} + F_{25}) \div 2$ | $SF_3 = (F_{17} + F_{25}) \div 2$ |
| $SF_4 = (F_{25} + F_{30}) \div 2$ | $SF_4 = (F_{25} + F_{30}) \div 2$ |
| $SF_5 = F_{30}$ | |

In sequence 1, the last frame is not incorporated as part of the $SF_4$, but is simply presented as the last frame. In Sequence 2, the spacing between frames which are averaged is adjusted throughout the sequence so that the last frame is incorporated in $SF_4$. In sequence 3, the spacing between frames averaged to produce $SF_4$ is adjusted to be 13 frames (rather than 8) to compensate for the end point. In sequence 4, the spacing between the last two averaged frames is adjusted to be 5 and an additional frame is presented to compensate for the end point. Sequence 5 compensates for the end point by spacing the last two frames averaged by 5 and omits use of an un-mixed frame for $SF_1$. Sequence 6, also spaces the last two mixed frames by 5 to compensate for the end point, but omits use of un-mixed frames at both beginning and end. Each of these sequences are within the scope of the invention. Those skilled in the art will appreciate that many variations of this process are possible for compensating for the end point utilizing the present invention.

The present shuttle process can be used as long as the system's buffer can fill rapidly enough to hold all of the frames needed to construct the shuttle frames. However, when the buffer fill rate is too slow for high speed shuttle operation, a different process is used. Consider, for example, a system with a maximum buffer fill rate of one non-contiguous frame per eight frame time intervals as shown in FIG. 9. Only one new frame per eight frames of video can be created. This problem is handled by holding a given frame long enough to compensate for this temporal limiting factor.

It is generally preferrable, as described above, for the starting and ending frames to not be mixed frames. For example, if frames $F_1$ through $F_{57}$ are to be displayed in 16× shuttle, the following sequence of frames are displayed:

$SF_1 = F1$ $SF_2 = (F_1 + F_{17})/2$ $SF_3 = (F_{17} + F_{33})/2$ $SF_4 = (F_{33} + F_{49})/2$ $SF_5 = (F_{49} + F_{57})/2$ $SF_6 = F_{57}$

In this example, the frame spacing between frames which are averaged is adjusted at the last mixed frame $SF_5$ to 8 so that the sequence ends on a frame which is not a mixed frame. In this instance, the shuttle frames (after $SF_1$ and before $SF_6$ are generated as:

$$SF_j = \frac{F_{p_n} + F_{p_{n-1}}}{2}$$

where $p_n$=1, 9, 17, 33, 49, 57. For different rates M and end points, the series $P_n$ would, of course, differ with the ultimate goal being a long term average number of mixed frames of approximately 1/M of the total original frames being used and end points having no mixed frames. The methods of FIGS. 4 and 8 account for not having a mixed frame as the first frame and can easily be modified to provide for having no mixed frame at the end point.

The shuttle play mode could also be implemented using a combination of more than two original frames to create the shuttle frames without departing from the invention.

Once again, for reverse shuttle speeds (e.g. −3 to −30), the present invention works in essentially the same manner. Since the video frames are randomly accessible, the only difference is that the frame numbers for the original data are renumbered in reverse order, or equivalently, the algorithm of FIG. 8 can be suitably modified to accomplish the reverse process.

Figure 10:
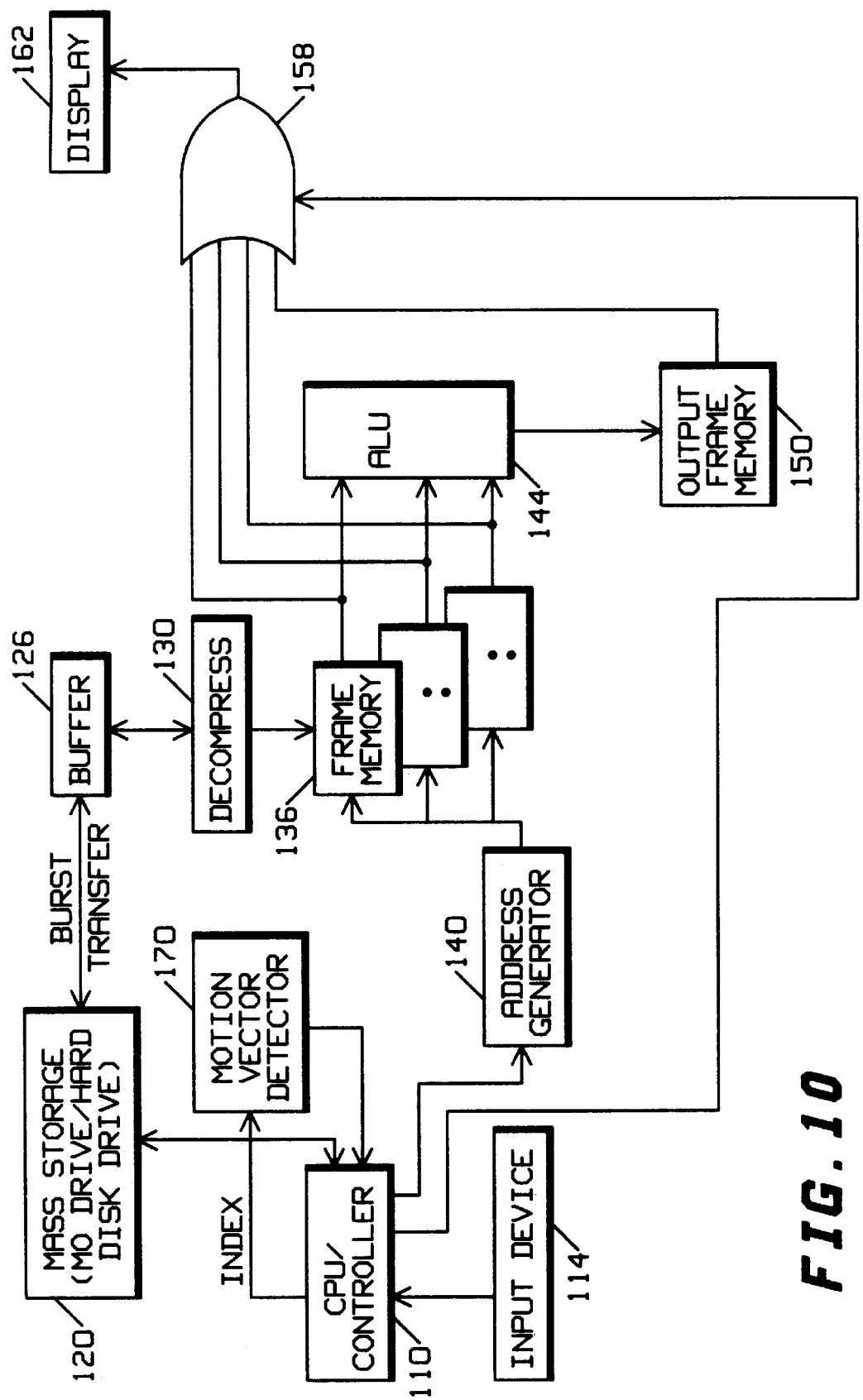
FIG. 10 is an illustration of the hardware configuration of the present invention.

Referring now to FIG. 10, a hardware embodiment of the present invention is shown. In the preferred embodiment, the present invention is implemented using a programmed digital computer such as CPU/controller 110 as both a central processor and as a control device. The computer includes memory such as random access memory (RAM) and read only memory (ROM) (not shown) in a conventional arrangement. An input device 114, which may be a general purpose input device such as a mouse or a computer keyboard, is used to select playback speed and other operational parameters. In other embodiments, dedicated input hardware can be devised to simulate the operation and feel of VTR controls, if desired.

The frames of original video data are stored on a mass storage device 120 such as, for example, a magneto-optical (MO) disk drive or an array of such drives operating in conjunction with conventional high speed hard disk drives. Access to the mass storage device 120 is through a buffer 126 which may include a high speed disk drive or RAM memory or a combination thereof.

In operation, compressed video frames are retrieved from mass storage device 120 in a burst transfer and stored in buffer 126 until needed. If a look-up table is used, it may also be stored in the mass storage device until needed. The compressed video frames are retrieved from the buffer 126 in accordance with the frame selection algorithm, as described previously, depending upon the operational mode (shuttle or high speed playback) and the speed selected via the input device 114. These frames are then decompressed by decompressor 130 and converted into their Y, $C_R$ and $C_B$ components (or other basic components such as RGB) and stored in a frame memory 136 with pixels at an address determined by address generator 140. The frames stored in frame memory 136 are then averaged on a pixel by pixel basis in a high speed arithmatic logic unit 145. The average values of each pixel is output to an output frame memory 150. The output of output frame memory 150 is provided, along with the frames stored in frame memory 136, to a multiplexer 158 for display on a display 162 at the predetermined frame rate of the system. The multiplexer 158 is controlled by CPU/controller 110 to select one of the four inputs for display.

The operation of the system may be enhanced by use of a motion vector detector 170. Motion vector detector 170 can be used to determine a more intelligent frame distribution for averaging to produce an enhanced image. Motion vector detector 170 receives frames from the CPU/controller 110 and determines which frames to combine and how to combine them to produce shuttle frames or mixed frames.

In the embodiment described above, the present invention is implemented using a dedicated ALU for performing the mixing function. However, those skilled in the art will recognize that a programmed general purpose processor operating at an adequately high speed could also be used. To compensate for the relatively low speed of MO disk drives, the data in the embodiment above is buffered in a high speed hard disk drive for display on a conventional video monitor. Those skilled in the art will appreciate that the present invention could also be implemented using dedicated hardware rather than the programmed control CPU without departing from the invention. Numerous other variations will occur to those skilled in the art upon consideration of the present invention.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for playback of video data at a speed greater than normal playback speed, comprising the steps of:

looking up a number of frames to be mixed in a look-up table;

generating a sequence of output frames including a mixed frame, said mixed frame having a component of each of said number of frames of said video data; and displaying said sequence of output frames.

2. The method of claim 1, wherein said mixed frame is created by the step of averaging two consecutive frames of data on a pixel by pixel basis.

3. The method of claim 1, wherein said mixed frame is created by the step of averaging three consecutive frames of data on a pixel by pixel basis.

4. The method of claim 1, wherein said mixed frame is created by the step of mixing two or more frames of data on a pixel by pixel basis.

5. The method of claim 1, wherein said output frames are displayed at a frame rate equal to a normal playback speed frame rate.

6. The method of claim 1, wherein said each of said output frames is a mixed frame created by the step of mixing two or more frames of data on a pixel by pixel basis.

7. The method of claim 1, wherein a plurality of said output frames are mixed frames with certain of said mixed frames created by the step of mixing two frames of data on a pixel by pixel basis and certain others of said mixed frames are created by the step of mixing three frames of data on a pixel by pixel basis.

8. The method of claim 1, wherein said output frames include a plurality of mixed frames and wherein said number of frames to be mixed can vary from mixed frame to mixed frame in accordance with said number of frames to be mixed called out by said look-up table.

9. A method for high speed shuttle playback of video data, comprising the steps of:

generating a sequence of output frames including a plurality of mixed frames, at least a first said mixed frame being created by the step of averaging a first and a second non-consecutive frame of video data on a pixel by pixel basis;

each said mixed frame including a component of a previous output frame; and displaying said sequence of output frames.

10. The method of claim 9, wherein a second said mixed frame is created by the step of averaging a second and a third non-consecutive frame of data on a pixel by pixel basis.

11. The method of claim 9, wherein shuttle frames are generated at a rate of 1 shuttle frame for each M video frames, where M is an integer.

12. The method of claim 11, wherein M is greater than or equal to three.

13. An apparatus for high speed playback of digital video data, comprising in combination:

mass storage means for storing frames of said video data;

input means for selecting a playback speed;

means for retrieving said frames of video data;

generating means for generating a sequence of output frames including a mixed frame, said mixed frame being an average of at least two non-consecutive frames of said video data; and display means for displaying said sequence of output frames.

14. The apparatus of claim 13, further comprising a look-up table for looking up a number of frames to be mixed by said generating means.

15. The apparatus of claim 14, wherein said output frames include a plurality of mixed frames and wherein said number of frames to be mixed can vary from mixed frame to mixed frame in accordance with said number of frames to be mixed called out by said look-up table.

16. The apparatus of claim 13, wherein said generating means includes an arithmatic logic unit for averaging said frames.

17. The apparatus of claim 13, further comprising buffer means for buffering said frames stored in said mass storage means.

18. The apparatus of claim 13, further comprising means for decompressing compressed frames stored in said mass storage means.

\* \* \* \* \*